(No Model.)

J. McCAFFREY.
NAILLESS HORSESHOE.

No. 478,455. Patented July 5, 1892.

WITNESSES:
Fred G. Dieterich
Edw. W. Byrn

INVENTOR:
James McCaffrey
BY
ATTORNEYS

UNITED STATES PATENT OFFICE.

JAMES McCAFFREY, OF PHILADELPHIA, PENNSYLVANIA.

NAILLESS HORSESHOE.

SPECIFICATION forming part of Letters Patent No. 478,455, dated July 5, 1892.

Application filed September 22, 1891. Serial No. 406,512. (No model.)

*To all whom it may concern:*

Be it known that I, JAMES McCAFFREY, of Philadelphia, in the county of Philadelphia and State of Pennsylvania, have invented a new and useful Improvement in Horseshoes, of which the following is a specification.

The object of my invention is to provide an improved horseshoe which shall dispense with the use of blacksmiths in shoeing horses and which shall avoid the necessity of driving nails into the horse's hoof with its incident dangers of laming the horse.

It consists in the peculiar construction and arrangement of a shoe consisting of a clip adapted to be clamped around the edge of the hoof, in combination with detachable wearing-plates, as will be hereinafter fully described.

Figure 1:
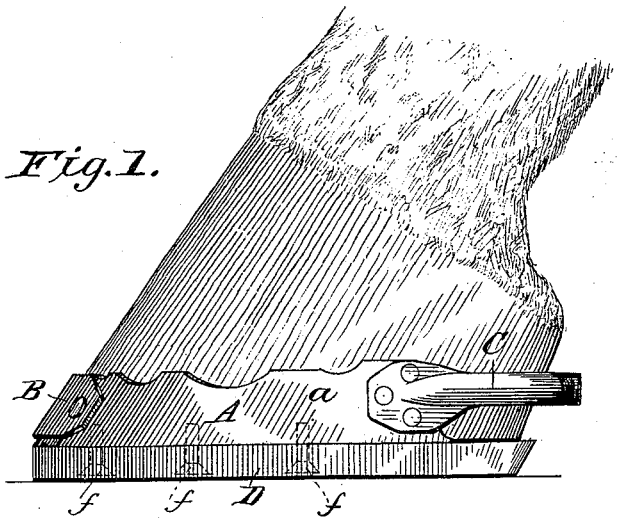
Figure 2:
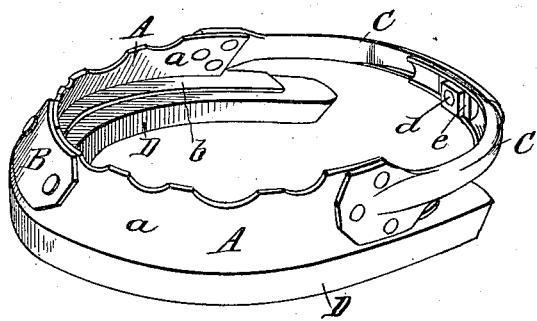
Figure 3:
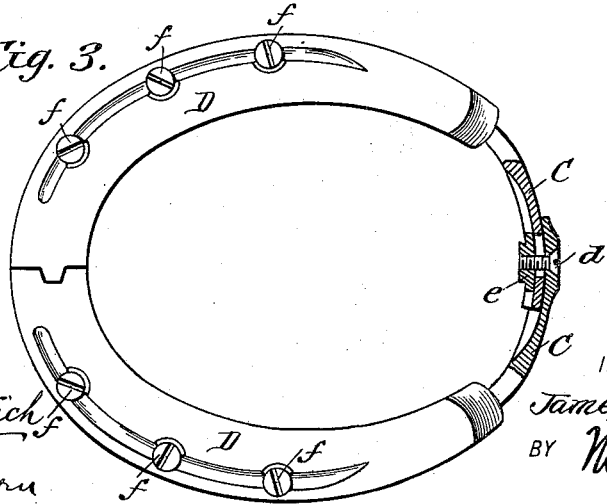

Figure 1 is a side view of the shoe applied to a hoof. Fig. 2 is a perspective view of the shoe removed from the hoof; and Fig. 3 is an inverted plan view with the joint formed by the ends of the clip and the fastening-nut shown in section.

The shoe is composed of a clip and detachable wearing-plates. The clip is composed of two malleable-iron castings A A, curved to conform to the hoof, a spring splice-plate B in front, riveted to and connecting the two clip-plates, and clamping-arms C C, made of light steel and riveted to the rear ends of the clip-plates. The clip-plates have an upper lip $a$ extending up over the outer surface of the hoof and a lower lip or base $b$ extending under the bottom edge of the hoof, the two lips being at an acute angle to each other, so that when clamped about the edge of the hoof the latter, being largest at the bottom, is retained securely in the shoe. The front plate B is a spring-plate of steel or hammered brass and it serves to permit the two clip-plates to be expanded or contracted in fitting the shoe on or taking it off the hoof.

The clamping-arms C C are made of thin steel, corrugated or concaved in cross-section, for lightness and strength. Their rear ends are perforated, the one with a round hole and the other with an elongated slot for adjustment, and through these perforations a screw $d$ passes into an elongated nut $e$, which lies within the concavity of the clamping-arms. This prevents the nut from turning and coming loose, while the head of the screw is riveted or upset against the outer surface of the clip-arm for the same purpose of preventing it from turning loose.

To the clip are detachably screwed the wearing-plates D D, which are constructed like an ordinary shoe, except that the two sides of the shoe are made of separate pieces connected loosely at the front by a tongue-and-groove joint. This permits the whole shoe to be expanded at this point in applying it to or removing the same from the horse's hoof.

To secure the wearing-plates D to the clip, screws $f$ pass up through the plates into the thick part of the clip, and when the wearing-plates of a shoe are to be replaced these screws are simply removed and new plates applied to the clip. To prevent the screws from turning and becoming loose, their heads should be slightly upset or riveted against the plates.

Having thus described my invention, what I claim as new is—

1. A horseshoe-clip having arms extending rearwardly and concaved or corrugated in cross-section, in combination with an elongated nut fitting in said concavity and a screw or bolt for fastening the arms together by said nut, substantially as shown and described.

2. A horseshoe consisting of the combination of two clip-plates A A, the spring splice-plate B, riveted to and connecting the front end of said clip-plates, the clamping-arms C C, riveted to the rear ends of the clip-plates and having a screw and nut for connecting them, and the detachable wearing-plates D D, substantially as shown and described.

JAMES McCAFFREY.

Witnesses:
 EDWD. W. BYRN,
 SOLON C. KEMON.